March 27, 1956  D. R. VOSS  2,739,360
SHELL-MOLD SEALING DEVICE
Filed Sept. 17, 1954
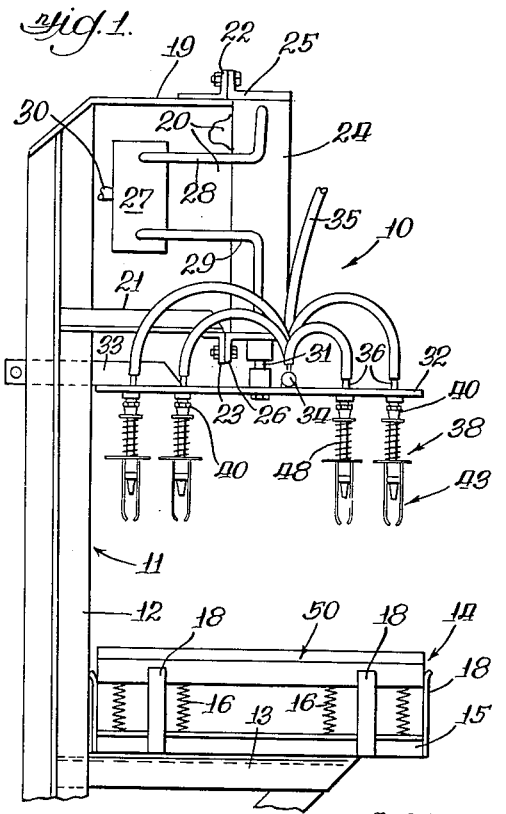
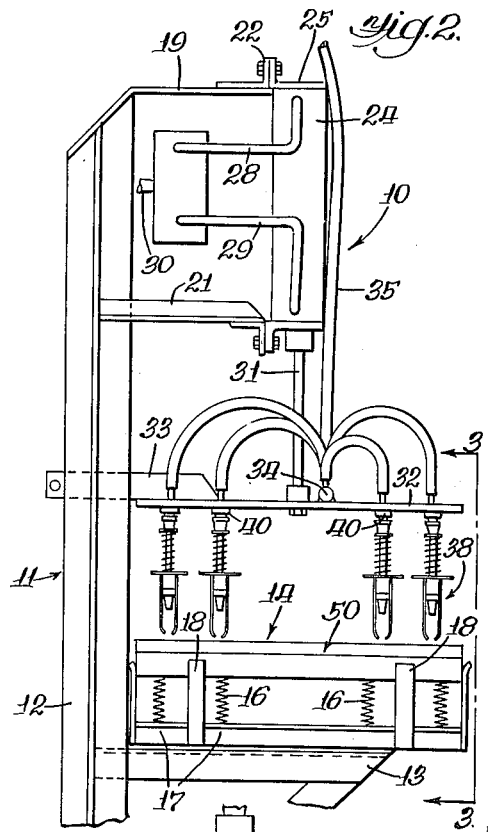
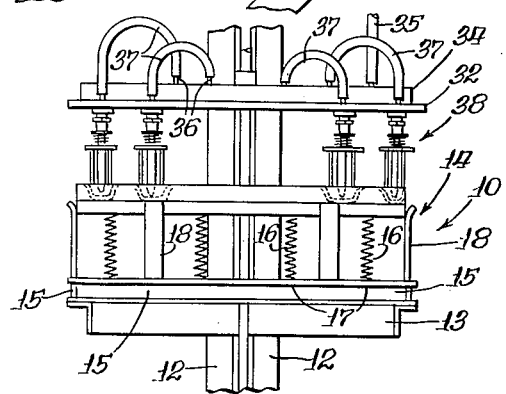
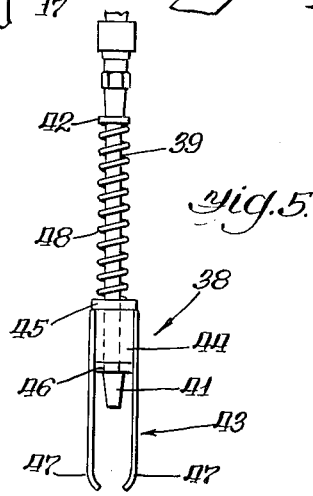
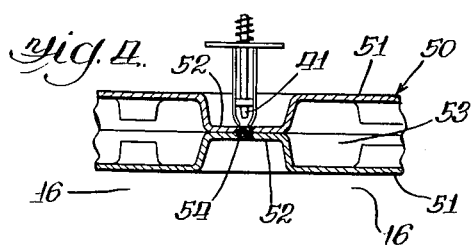
INVENTOR.
Don R. Voss
BY
Paul O. Pippel
Atty.

United States Patent Office 2,739,360
Patented Mar. 27, 1956

2,739,360

SHELL-MOLD SEALING DEVICE

Don R. Voss, Indianapolis, Ind., assignor to International Harvester Company, a corporation of New Jersey Application September 17, 1954, Serial No. 456,727

9 Claims. (Cl. 22—31)

This invention relates to an improvement in a machine for assembling and sealing shell molds.

In the development of the shell-mold foundry technique, one of the major problems has been to assemble the complementary sections of the shell mold in order to provide a complete mold ready for the pouring operation. In the manufacture of shell molds, it is necessary to first form the complemental sections from a binder and sand mixture which is suitably cured by heating. The resultant shell molds are extremely frangible; and in order to place the shell-mold sections in proper assembly, it hs been necessary that they be maintained in a heated and an unwarped position. Various devices and methods have been developed for keeping the molds in an unwarped position and for assembling the same. The common practice is to assemble the half portions of the mold while they are still heated by sprinkling an adhesive on the matching surfaces, holding them together by various devices, and permitting the residual heat of the shells to harden the adhesive. Since the shells are heated, they are still very flexible and warpage can readily occur. It is a prime object of this invention, therefore, to provide an improved device and method for sealing and assembling the complemental sections of shell molds so that a minimum warpage and change of shape occurs in the final assembled mold.

It is another object of this invention to provide an improved shell-mold sealing device adapted to apply even spring pressure to various portions of the shell-mold sections so that they may be prevented from changing shape during the process of assembling the sections into an assembled mold.

Another object is to provide improved means for assembling unheated shell molds, and for curing the adhesive which is applied to hold the shell in assembly.

A still further object is to provide an improved machine for applying a constant resilient pressure on opposite portions of a shell mold while the portions of the mold are being assembled in connected relation, the device also including means for quickly curing the adhesive which is used in the connection of the molds so that the time of possible shrinkage and warpage is greatly reduced.

A still further object is to provide an improved process for assembling complemental sections of shell molds; the process consisting of applying an adhesive to contiguous adjacent separable sections of the mold, and clamping the sections resiliently together while applying a heat for quickly curing the adhesive to maintain the sections in assembled relation.

These and further objects will become more readily apparent from a reading of the specification when examined in connection with the accompanying sheet of drawing.

In the drawing:

Figure 1 is a side-elevational view of a shell-mold sealing apparatus;

Figure 2 is a side-elevational view of the apparatus shown in Figure 1, the same being disclosed as it is moving into an operating position;

Figure 3 is a sectional view taken substantially along the line 3—3 of Figure 2, showing an operating position of a shell-mold sealing apparatus;

Figure 4 is a fragmentary sectional view of a shell mold disposed in a shell-mold sealing machine, showing a burner nozzle and pressure-applying device operating on adjacent complementary portions of the mold; and Figure 5 is a detail view in elevation of a burner nozzle and pressure-applying device.

A shell-mold sealing and assembly device, or apparatus, is generally designated by the reference character 10. The shell-mold device 10 comprises an upright supporting structure 11 having a pair of upright members 12. A horizontal table is suitably supported on the upright members 12, the said table 13 supporting a mold-receiving cradle, generally designated by the reference character 14. The cradle 14 comprises angle members 15 suitably connected in rectangular relation and supported on the table 13. A plurality of upright springs 16 are suitably connected to the angles 15, as indicated at 17. The upper ends of the springs 16 remain free and unconnected for suitably supporting a shell mold, as will become more readily apparent from the following description. A plurality of vertically extending guide straps, or elements, 18 are also connected to the angles 15. A support plate 19 is connected to the upper ends of the upright members 12. The support plate 19 is suitably connected to side plates 20, which in turn are connected at their lower ends to angle members 21. A laterally extending upper angle bracket 22 is suitably connected to the support plate 19. A lower angle bracket 23 is suitably connected to the angle members 21. An extensible fluid-pressure piston device 24 is suitably connected to the upper and lower brackets 22 and 23, as respectively indicated at 25 and 26. The unit 24 may be suitably operated by pneumatic or hydraulic pressure, whichever may be most readily available. A distributor valve 27 is connected to one of the side plates 20, this distributor valve being of conventional form, and including conduits 28 and 29 extending to opposite ends of the extensible unit 24. An inlet line 30 extends into the valve 27.

A piston arm, or ram, 31 is adapted to be moved within the unit 24, the said arm 31 being connected to a nozzle support in the form of a plate 32. The plate 32 has connected thereto a guide arm 33 suitably slidably connected to the upright members 12. A header, or manifold, conduit 34 is supported on the plate 32. The manifold conduit 34 is connected to a flexible hose 35 which may be in communication with a suitable source of fuel, such as gas, oil, etc. Connector nipples 36 on the manifold conduit 34 are suitably connected to flexible conduits 37 in communication with a plurality of burner nozzles, generally designated at 38.

Each burner nozzle 38 includes a pipe connection 39 suitably connected to the plate 32, as indicated at 40. The pipe connections 39 are in communication with the conduits 37. Each pipe connection also is provided at its lower end with a burner tip 41 of conventional construction. A spring collar, or retainer, 42 is provided on the pipe connection 39. A pressure-applying device, generally designated at 43, is also provided at the lower end of the pipe connection 39. The pressure-applying device 43 includes a sleeve 44 which is slidably positioned on the connection 39, the said sleeve 44 being retained on the said connection 39 by virtue of the burner tip 41. An upper collar 45 is connected to the sleeve 44. A lower collar 46 is connected to the lower end of the sleeve 44. Contact elements, or vertically extending pressure fingers, 47 are suitably connected to the collars 45 and 46, and are movable relative to the pipe connection 39 with the sleeve 44. A spring 48 is disposed between the retainer 42, and the collar 45 for constantly urging the pressure-applying device 43 in the direction of the cradle 14.

In the operation of the assembly device 10, a shell mold, generally designated at 50, is placed on the cradle 14, as best shown in Figures 1, 2, and 3. The shell mold 50 comprises complementary half portions, or sections, 51. The sections 51 are of very frangible nature and include contiguous complementary flanges, or adjacent wall portions, 52, as best shown in Figure 4. The complementary sections 51, in an unheated or cold condition, are placed in complementary relation to form a metal-receiving cavity, as indicated at 53. Prior to the placing of the sections 51 in the position indicated, the adjacent wall portions are suitably coated with an adhesive, as indicated at 54 in Figure 4. Generally, the sections 51 have a number of these adjacent wall portions 52, and these are suitably coated. The number of nozzles 38 utilized in the curing operation will, of course, be determined by the number of adjacent portions which are so coated with an adhesive. The mold 50, therefore, is placed in the position shown on the cradle 18, the cradle 18 serving to provide a resilient bed for the said mold. The apparatus 10 is now set in motion, and the unit 24 is actuated to push the plate 32 downwardly until, as indicated in Figures 3 and 4, the fingers 47 are in resilient pressure engagement with the adjacent portions 52 of the shell molds. The machine is so designed that each of the nozzle tips 41 will move downwardly below the sleeves 44 so that the spring pressure of the spring 48 is effective to resiliently urge the fingers 47 against the portions 52. Since the lowermost section 51 of the mold 50 is also resiliently cradled by means of the springs 16, the pressure so applied will clamp the sections together and greatly prevent their warping.

As soon as the sections have thus been resiliently clamped, the machine is effective to ignite gas, or other fuel, emerging from the nozzle tips 41 for applying heat to each of the portions 52. This operation of the ignition of the gas, or fuel, need not be elaborated upon since any automatic ignition device may be utilized which is effective to automatically ignite the burners when they are in position. Also, the relays and electrical devices necessary may be conventional, and therefore, will not be gone into in detail. As the flame from the burner tip heats the adhesive 54, it is immediately set, or dried; thus gluing, or sealing, the sections 51 in assembly. This operation is almost simultaneous with the clamping; and thus, warpage of the sections is greatly eliminated since the quick sealing of the members together provides sufficient strength in the mold to prevent such warpage. The plate 32 and the nozzles are then moved upwardly, the assembled mold 50 is removed, and the machine is ready for the next assembly operation.

It can be seen that the molds are resiliently supported and clamped during the assembly operation, and the application of heat for curing the adhesive is almost simultaneous so that chances of deformation of the sections are greatly reduced. Thus it can be seen that the objects of the invention have been fully and completely achieved, and it must be understood that changes and modifications may be made without departing from the spirit of the invention as disclosed or the scope thereof as defined in the appended claims.

What is claimed is:

1. A device for connecting complementary sections of a shell mold in assembly comprising; a support, a table positioned on said support, horizontally spaced guide elements on said table projecting upwardly with respect thereto, resilient members on said table projecting upwardly with respect thereto to provide a resilient mold-supporting cradle, a bracket slidably positioned on said support for vertical movement relative to said cradle, a pipe manifold supported on said bracket, means connecting said pipe manifold to a source of gas, a plurality of burner nozzles connected to said bracket in horizontally spaced relation, each nozzle including a burner tip and a pipe connection connected to said tip and to said manifold, a pressure-applying member including a sleeve slidingly connected to said pipe connection, fingers connected to said sleeve and projecting downwardly with respect thereto, a spring retainer on said pipe connection, a spring disposed between said sleeve and said retainer for urging said pressure-applying member in the direction of said cradle, and power-actuating means associated with said support for moving said bracket and said nozzles adjacent to the contiguous flanges of complementary shell-mold sections resiliently supported within said cradle, whereby said fingers engage said flanges to maintain the same in engagement during the heating by said burner nozzles of an adhesive disposed between the flanges.

2. A device for connecting complementary sections of a shell mold in assembly comprising; a support, a table positioned on said support, guide elements on said table projecting upwardly with respect thereto, resilient members on said table projecting upwardly with respect thereto to provide a resilient mold-supporting cradle, a bracket slidably positioned on said support for vertical movement relative to said cradle, a plurality of burner nozzles connected to said bracket in horizontally spaced relation, means connecting said burner nozzles to a source of fuel, each nozzle including a burner tip and a pipe connection connected to said tip, a pressure-applying member including a sleeve slidingly connected to said pipe connection, fingers connected to said sleeve and projecting downwardly with respect thereto, a spring retainer on said pipe connection, a spring disposed between said sleeve and said retainer for urging said pressure-applying member in the direction of said cradle, and power-actuating means associated with said support for moving said bracket and said nozzles adjacent to the contiguous flanges of complementary shell-mold sections resiliently supported within said cradle, whereby said fingers resiliently engage said flanges to maintain the same in engagement during the heating by said burner nozzles of an adhesive disposed between the flanges.

3. A device for connecting complementary sections of a shell mold in assembly comprising; a support, a table positioned on said support, guide elements on said table, resilient members on said table projecting upwardly with respect thereto to provide a resilient mold-supporting cradle, a bracket slidably positioned on said support for vertical movement relative to said cradle, a plurality of burner nozzles connected to said bracket in horizontally spaced relation, each nozzle including a burner tip and a pipe connection connected to said tip and to a source of fuel, a pressure-applying member including a sleeve slidingly connected to said pipe connection, a finger connected to said sleeve and projecting downwardly with respect thereto, a spring retainer on said pipe connection, a spring disposed between said sleeve and said retainer for urging said pressure-applying member in the direction of said cradle, and power-actuating means associated with said support for moving said bracket and said nozzles adjacent to the contiguous flanges of complementary shell-mold sections resiliently supported within said cradle, whereby said finger engages said flanges to maintain the same in engagement during the heating by said burner nozzles of an adhesive disposed between the flanges.

4. A device for connecting complementary sections of a shell mold in assembly comprising; a support, a table positioned on said support, guide elements on said table, resilient members on said table projecting upwardly with respect thereto to provide a resilient mold-supporting cradle, a bracket slidably positioned on said support for vertical movement relative to said cradle, a plurality of burner nozzles connected to said bracket, each nozzle including a burner tip and a pipe connection connected to said tip and to a source of fuel, a pressure-applying member including a sleeve slidingly connected to said pipe connection, a contact element connected to said sleeve and projecting downwardly with respect thereto, a spring retainer on said pipe connection, a spring disposed between said sleeve and said retainer for urging said pressure-applying member in the direction of said cradle, and power-actuating means associated with said support for moving said bracket and said nozzles adjacent to the contiguous flanges of complementary shell-mold sections resiliently supported within said cradle, whereby said contact element resiliently engages said flanges to maintain the same in engagement during the heating by said burner nozzles of an adhesive disposed between the flanges.

5. A device for connecting complementary sections of a shell mold in assembly comprising; a support, a table positioned on said support, resilient members on said table to provide a resilient mold-supporting cradle, a bracket slidably positioned on said support for vertical movement relative to said cradle, a plurality of burner nozzles connected to said bracket in horizontally spaced relation, each nozzle including a burner tip and a pipe connection connected to said tip and to a source of fuel, a pressure-applying member including a sleeve slidingly connected to said pipe connection, a pressure-contact element connected to said sleeve and projecting downwardly below the burner tip, a spring on said sleeve for urging said pressure-contact element in the direction of said cradle, and power-actuating means associated with said support for moving said bracket and said nozzles adjacent to the contiguous flanges of complementary shell-mold sections resiliently supported on said cradle, whereby said contact element engages said flanges to maintain the same in engagement during the heating by said burner nozzles of an adhesive disposed between the flanges.

6. A device for connecting complementary sections of a shell mold in assembly comprising; a support, resilient members positioned on said support to provide a resilient mold-supporting cradle, supporting means connected to said support for relative movement with respect to said cradle, said supporting means including a movable burner-nozzle bracket, burner nozzles carried by said bracket, means connecting said burner nozzles to a source of fuel, a pressure-applying member connected to each burner nozzle, said member including a resilient contact element normally urged in the direction of said cradle, and means for moving said supporting means and nozzle bracket into adjacent relation with respect to the complementary contiguous flanges of a shell mold carried on the cradle, whereby said contact element resiliently engages said flanges to maintain the same in contact during heating by said burner nozzles of an adhesive disposed between the flanges.

7. A device for connecting complementary sections of a shell mold in assembly comprising; a support, resilient members positioned on said support to provide a resilient mold-supporting cradle, a movable burner-nozzle bracket movably connected to said support, burner nozzles carried by said bracket, means connecting said burner nozzles to a source of fuel, a pressure-applying member connected to each burner nozzle, said member including a resilient contact element normally urged in the direction of said cradle, and means for moving said nozzle bracket into adjacent relation with respect to the complementary contiguous flanges of a shell mold carried on the cradle, whereby said contact element resiliently engages said flanges to maintain the same in contact during heating by said burner nozzles of an adhesive disposed between the flanges.

8. A device for connecting complementary sections of a shell mold in assembly comprising; a support, resilient members positioned on said support to provide a resilient mold-supporting cradle, a movable burner-nozzle bracket movably connected to said support, burner nozzles carried by said bracket, means connecting said burner nozzles to a source of fuel, a resilient pressure-applying member connected to each burner nozzle, and means for moving said nozzle bracket into adjacent relation with respect to the complementary contiguous flanges of a shell mold carried on the cradle, whereby said pressure-applying member resiliently engages said flanges to maintain the same in contact during heating by said burner nozzles of an adhesive disposed between the flanges.

9. A device for connecting complementary sections of a shell mold in assembly comprising; a support, resilient members positioned on said support to provide a resilient mold-supporting cradle, a movable burner-nozzle bracket movably connected to said support, burner nozzles carried by said bracket, means connecting said burner nozzles to a source of fuel, a resilient pressure-applying member supported by said bracket and positioned adjacent each burner nozzle, and means for moving said nozzle bracket into adjacent relation with respect to the complementary contiguous flanges of a shell mold carried on the cradle, whereby said pressure-applying member resiliently engages said flanges to maintain the same in contact during heating by said burner nozzles of an adhesive disposed between the flanges.

References Cited in the file of this patent

UNITED STATES PATENTS

| 2,230,621 | Loew | Feb. 4, 1941 |
| 2,520,978 | Super | Sept. 5, 1950 |

OTHER REFERENCES

Am. Foundryman, August 1952, pages 42–46.
Iron Age, June 26, 1952, pages 112–116.
Business Week, July 5, 1952, pages 100–101.